United States Patent
Zhao et al.

(10) Patent No.: US 9,283,651 B2
(45) Date of Patent: Mar. 15, 2016

(54) APPARATUS INCLUDING ELECTRICAL LAPPING GUIDE AND METHODS OF USING THE SAME

(71) Applicant: Seagate Technology LLC, Cupertino, CA (US)

(72) Inventors: Yongjun Zhao, Eden Prairie, MN (US); David C. Seets, Excelsior, MN (US); Mark Ostrowski, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 168 days.

(21) Appl. No.: 14/019,903

(22) Filed: Sep. 6, 2013

(65) Prior Publication Data

US 2015/0072593 A1 Mar. 12, 2015

(51) Int. Cl.
*B24B 37/10* (2012.01)
*B24B 49/10* (2006.01)
*B24B 37/013* (2012.01)
*G11B 5/31* (2006.01)

(52) U.S. Cl.
CPC .............. *B24B 49/10* (2013.01); *B24B 37/013* (2013.01); *G11B 5/3169* (2013.01); *G11B 5/3173* (2013.01)

(58) Field of Classification Search
CPC ....................................................... B24B 49/10

USPC ............. 451/5, 8, 9, 10, 41, 28, 1; 29/603.16, 29/603.09, 603.1
See application file for complete search history.

(56) References Cited

U.S. PATENT DOCUMENTS

| 7,996,986 | B2 | 8/2011 | Gokemeijer |
| 8,307,539 | B1 | 11/2012 | Rudy et al. |
| 8,351,305 | B2 | 1/2013 | Zhou et al. |
| 8,375,565 | B2 | 2/2013 | Hu et al. |
| 8,379,494 | B2 | 2/2013 | Peng et al. |
| 8,411,393 | B2 | 4/2013 | Zou et al. |
| 2010/0208391 | A1 | 8/2010 | Gokemeijer |
| 2010/0321814 | A1* | 12/2010 | Zou et al. ................. 360/59 |
| 2011/0294398 | A1 | 12/2011 | Hu et al. |
| 2012/0099407 | A1 | 4/2012 | Hipwell et al. |
| 2012/0327752 | A1 | 12/2012 | Snyder |

* cited by examiner

*Primary Examiner* — Monica Carter
*Assistant Examiner* — Lauren Beronja
(74) *Attorney, Agent, or Firm* — Hollingsworth Davis, LLC

(57) ABSTRACT

An electrical lapping guide has a body with a thickness along a wafer axis, the body comprising a layer of conductive material having a resistivity. The conductive material layer comprises a first contact region and a second contact region, the first and second contact regions configured to electrically connect the electrical lapping guide to electrical leads. A lapping edge comprises an air-bearing plane axis perpendicular to a lapping axis, and a back edge opposite the lapping edge, the back edge comprising a plurality of notches.

25 Claims, 10 Drawing Sheets

APPARATUS INCLUDING ELECTRICAL LAPPING GUIDE AND METHODS OF USING THE SAME

SUMMARY

Embodiments are directed to an apparatus comprising an electrical lapping guide. The electrical lapping guide includes a body having a thickness along a wafer axis. The body has a first contact region and a second contact region having a minimal distance therebetween. The first contact region and the second contact region are configured to electrically connect the electrical lapping guide to electrical leads. The body of the electrical lapping guide also includes a lapping edge comprising an air-bearing plane axis, the air-bearing plane axis being perpendicular to a lapping axis; and a back edge opposite the lapping edge, the back edge comprising a plurality of notches.

Other embodiments are directed to an apparatus that includes a pre-processed wafer comprising, an air-bearing plane axis parallel to the lapping edge and a wafer axis perpendicular to the lapping axis, at least one pre-processed feature disposed on the wafer, and at least one electrical lapping guide. The at least one electrical lapping guide includes a first contact region and a second contact region, the contact regions configured to electrically connect the electrical lapping guide to electrical leads; a lapping edge comprising an air-bearing plane axis, the air-bearing plane axis being perpendicular to a lapping axis; and a back edge opposite the lapping edge, the back edge comprising a plurality of notches. The at least one pre-processed feature is disposed adjacent to the at least one electrical lapping guide along the air-bearing plane axis.

Additional embodiments are directed to methods that include applying pressure with a lapping tool to a wafer comprising a lapping surface, at least one pre-processed feature, and at least one electrical lapping guide. The electrical lapping guide comprises a first contact region and a second contact region, the contact regions configured to electrically connect the electrical lapping guide to electrical leads; a lapping edge comprising an air-bearing plane axis, the air-bearing plane axis being perpendicular to a lapping axis; and a back edge opposite the lapping edge, the back edge comprising a plurality of notches. The at least one pre-processed feature is disposed adjacent to the at least one electrical lapping guide along the air-bearing plane axis. The method further includes detecting a resistance across the electrical lapping guide, and removing the lapping tool when the resistance across the electrical lapping guide reaches a predetermined value.

The above summary is not intended to describe each disclosed embodiment or every implementation of the present disclosure. The figures and the detailed description below more particularly exemplify illustrative embodiments

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
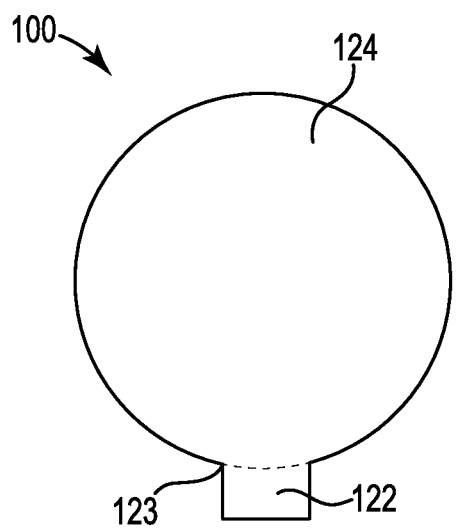
FIG. 1 is a plan view of an embodiment of a near field transducer made using an embodied method.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Read/write heads for heat-assisted magnetic recording (HAMR) can be built on wafer substrates by thin film deposition according to various embodiments. The wafer substrates can then be divided into multiple bars that each contains a multitude of components (such as read/write heads, for example). The bars can be processed into finished components (such as finished read/write heads, for example) by lapping along one longitudinal edge of the bar to precisely define an air-bearing surface (ABS) of each component. The bar can then be divided into individual components. Lapping can be performed as a wet grinding process in which material is removed to reach the ABS. Electronic lapping guides or ELGs can be used to monitor the lapping. Generally, ELGs are formed in the areas between the electronic components. Each ELG includes an electrically conductive structure whose ends can be connected to leads that carry current from a control circuit. The lapping can be controlled by monitoring the resistance of the ELG(s) as material is removed in the grinding process.

The present disclosure relates to apparatuses and methods that include electrical lapping guides, which are also referred to as ELGs, for use in lapping processes. Disclosed ELGs can provide greater control and accuracy in lapping processes. The present disclosure also provides methods of using the ELGs disclosed herein, and wafer processes that include disclosed ELGs. ELGs disclosed herein can be used to process numerous types of electrical components. Electrical components that can be processed using disclosed ELGs can be parts of magnetic recording heads according to various embodiments. There are numerous types of magnetic recording heads. One of those is referred to as a heat-assisted magnetic recording (HAMR) head. A HAMR head can increase storage capacity by directing an electromagnetic wave (e.g. visible, infrared, or ultraviolet light) onto a surface of a data storage medium to raise the temperature of the localized area of the medium to facilitate switching of the magnetization of the area. A transducer, more specifically a near field transducer (NFT), can be used to concentrate the radiation generated from an external source or an internal source, to a localized spot smaller than the diffraction limit.

The shape and dimensions of an NFT of a HAMR head can require stringent tolerances in manufacturing to realize the advantages of HAMR technology. The length of the peg region is an important dimension to the performance of HAMR recording heads and is generally controlled by lapping processes described herein. There is a need to stringently control the peg region length of NFTs that can be provided by improved lapping processes. The present disclosure provides apparatuses and methods that include ELGs for use in improved lapping processes. The disclosed ELGs can provide greater control and accuracy in the lapping processes.

FIG. 1 is a plan view of an embodiment of a near field transducer (NFT) made using an embodied method. NFT 100 has enlarged disc region 124 in contact with peg region 122. The point where enlarged disk region 124 contacts peg region 122 is break point 123. The peg length is measured from the tip of peg region 122 to break point 123.

Disclosed is an apparatus that includes an electrical lapping guide according to various embodiments. The electrical lapping guide includes a layer of material having a resistivity. The layer of material comprises a first and second contact regions configured to electrically connect the electrical lapping guide to electrical leads. The electrical leads can be connected to a device that can measure electrical properties, such as resistivity, of the electrical lapping guide. The disclosed electrical lapping guide includes a lapping edge that includes an air-bearing plane axis. The air-bearing plane axis is orthogonal to a lapping axis. The disclosed electrical lapping guide also has a back edge opposite the lapping edge. The back edge comprises a plurality of notches.

Figure 2:
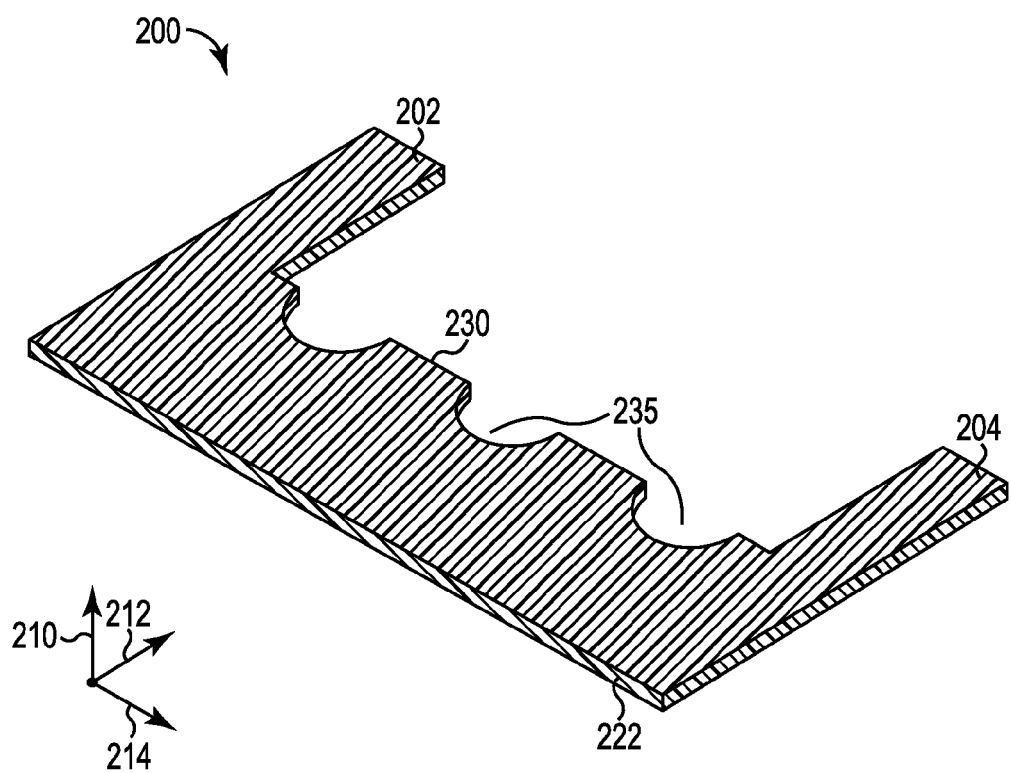
FIG. 2 is a perspective view drawing of an embodiment of a disclosed electrical lapping guide.

FIG. 2 is a perspective view drawing of an embodiment of a disclosed electrical lapping guide. Electrical lapping guide 200 is made of a conductive material that has a resistivity. In some embodiments, the conductive material can have a resistivity of greater than or equal to $5 \times 10^{-8}$ ohm-m. In other embodiments, the conductive material can have a resistivity of greater than $1 \times 10^{-7}$ ohm-m. The conductive material can be selected from chromium, tantalum, tungsten, titanium, vanadium, ruthenium, rhodium, and a combination thereof. Electrical lapping guide 200 includes first contact region 202 and second contact region 204 that can be configured to connect electrical lapping guide 200 to electrical leads. In the drawing depicted in FIG. 2, electrical lapping guide 200 is oriented relative to three mutually orthogonal axes as shown. Direction 210 is the wafer axis, 212 is the lapping axis, and 214 is the air-bearing plane axis. Lapping edge 222 includes air-bearing plane axis 214 as shown. Air-bearing plane axis 214 is orthogonal to lapping axis 212. Opposite lapping edge 222 is back edge 230. Back edge 230 includes a plurality of notches 235. Electrical lapping guide 200 has three semicircular notches 235 in back edge 230 for illustrative purposes only. Disclosed electrical lapping guides can have more or less notches than the three illustrated in FIG. 2. In some embodiments, the disclosed electrical lapping guides can have more than 10, more than 30, more than 50, more than 75, or even more than 100 notches. The shape, size, and number of notches can be selected to amplify the sensitivity to changes resistance of the electrical lapping guide. This can provide for greater control and accuracy in the lapping processes of adjacently located NFTs.

The plurality of notches in the back edge of the disclosed electrical lapping guide can vary in size and shape. In some embodiments, the shape of at least one of the plurality of notches and can be directly correlated with the shape of the pre-processed feature being concurrently processed (e.g., have the same shape of at least a portion of the pre-processed feature). The function of the plurality of notches is to reduce the conductivity (increase the resistivity) of the electrical lapping guide between the first contact region and the second contact region by reducing the amount of conductive material between those two contact regions. During lapping, one or more NFTs having an enlarged disk region and a peg region can be processed on a wafer at the same time as the electrical lapping guide. The wafer can be lapped along a lapping edge that includes the lapping edge of one or more electrical lapping guides as well as the peg tip of NFTs that are on the same wafer as shown, for example, in FIGS. 3A-3J and FIG. 4 described later herein. In some embodiments, the shape of the notches can be the similar to the shape of the enlarged region of the correlated NFT. For example, when the enlarged region of the NFT is a disk with a circular cross-section, the notches in the corresponding electrical lapping guide can be semi-circles that have the same diameter and the circular cross-section of the enlarged region.

The notches can have different shapes. In some embodiments, they can have semi-circular shapes. In other embodiments, they can have semi-elliptical shapes that can correspond to NFTs having enlarged regions that have elliptical cross-sections. Other shapes such as v-shaped notches, semi-square-shaped notches (u-shapes, for example), semi-polygonal-shaped notches, or any other notches that are combinations of these shapes are also within the scope of this disclosure. In other embodiments, more complex shapes may be used. The number and shapes of the notches can serve to amplify the sensitivity of the electrical lapping guide and, in turn, can amplify the sensitivity of the lapping of both the electrical lapping guide and the peg regions of the associated NFTs on the same wafer as the electrical lapping guide. In particular, the electrical lapping guide can provide a very sensitive way of measuring and controlling the lapping of the peg region of the associated NFTs on the same wafer so that the peg tip of the NFT is lapped to a precise distance from the break points of the associated NFTs.

With respect to the disclosed ELGs, the minimal distance between the first contact region and the second contact region can determine the minimal length of an effective resistor formed by the ELG. In some embodiments, the minimal length of the effective resistor can be from about 5 µm to about 900 µm. In other embodiments, the minimal length of the resistor can be from about 20 µm to about 100 µm. In some embodiments, the minimal length of the resistor can be about 45 µm. The length of the entire ELG along the lapping edge determines the width of the contact regions and can be from about 10 µm to about 1000 µm. In other embodiments, the length of the ELG can be from about 50 µm to about 200 µm. In some embodiments, the length of the entire ELG can be about 105 µm. These dimensions along with the thickness of the ELG along the wafer axis can determine the absolute value of the resistance of the ELG. In some embodiments, the thickness of the ELG can be from about 5 nm to about 1000 nm. In other embodiments, the thickness of the ELG can be from about 10 nm to about 100 nm. In some embodiments, the thickness of the ELG can be about 26 nm or even about 18 nm.

The disclosed ELGs as described herein can be connected, via electrical leads for example, to a control circuit (controller) so that the resistance across the ELG can be monitored. The resistance across the ELG can be monitored in order to control the lapping process as described later herein. The first and second contact regions can either be extensions of the body of the ELG as shown in FIG. 2 or they can be separated structures that are formed and electrically connected. In the embodiment illustrated in FIG. 2, the first and second contact regions are extensions of the body of the ELG that extend farther in the lapping direction (along the lapping axis). This can allow for electrical connection to the ELG throughout the lapping process because the first and second contact regions extend far enough in the lapping direction so as not to be lapped away during the lapping process.

Embodiments of an apparatus are also disclosed that comprise a pre-processed wafer. The pre-processed wafer includes a lapping axis parallel to an air-bearing plane axis and a wafer axis perpendicular to the lapping axis. The pre-processed wafer can also include at least one pre-processed feature disposed on the wafer. At least one ELG and at least one pre-processed feature can be included in a pre-processed wafer. The term "pre-processed," as used herein, generally refers to a wafer, a feature, or a combination thereof, that have not yet been subjected to lapping. Exemplary pre-processed features can include, but are not limited to, components of magnetic read/write heads. In some embodiments, disclosed ELGs can be utilized for processing near field transducers (NFTs) for heat assisted magnetic recording (HAMR) heads.

In some embodiments, a pre-processed wafer can include at least one ELG and at least one pre-processed feature. The pre-processed feature can be disposed in or on the wafer adjacent to the ELG along the air-bearing surface axis. The pre-processed wafer can extend in all directions even though it is depicted as having a rectangular shape in the accompanying figures.

In some embodiments, the pre-processed feature can be an NFT, for example, an NFT that includes an enlarged region and a peg region such as the NFT illustrated in FIG. 1. The disclosed apparatus that includes a pre-processed wafer also includes at least one electrical lapping guide as described above. The electrical lapping guide comprises first contact region and a second contact region, the contact regions configured to electrically connect the electrical lapping guide to electrical leads. The disclosed electrical lapping guide also includes a lapping edge that includes an air-bearing plane axis, the air-bearing plane axis being perpendicular to a lapping axis, and a back edge opposite the lapping edge that comprises a plurality of notches. The pre-processed feature is disposed adjacent to the electrical lapping guide along the air-bearing plane axis. The disclosed apparatus that includes a pre-processed wafer and a method of making the same is best illustrated in FIGS. 3A-3J and FIG. 4.

Figure 3A:
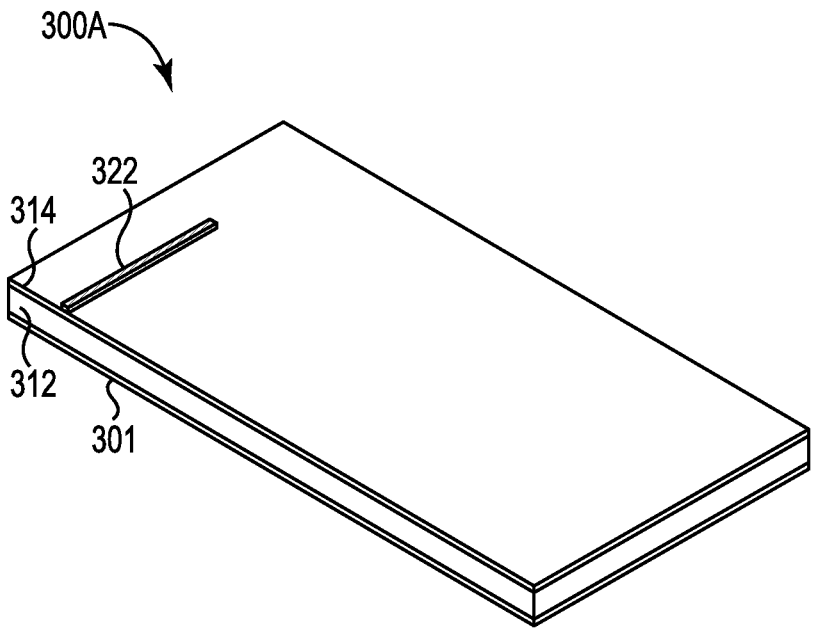
FIGS. 3A-3J are sequential perspective views illustrating various steps in the process of making embodied apparatuses that include a pre-processed wafer.

FIGS. 3A-3J and FIG. 4 illustrate a method of making a pre-processed wafer that includes, for example, NFTs that include a disk-like enlarged region and a peg region as shown in FIG. 1. The disclosed method is not limited to the illustrated pre-processed wafers but can also be used to make any NFTs that have a peg region or can be processed adjacent to a disclosed electrical lapping guide. The method of making a pre-processed wafer begins with deposition of waveguide core layer 312 on bottom cladding layer 301 (that has been previously deposited on a substrate wafer) followed by deposition of a 20-30 nm core-to-NFT spacer layer (alumina or silica, for example) 314 as shown in FIG. 3A. Core layer materials can be a dielectric layer that has a high index of refraction compared to the index of refraction of core-to-NFT spacer layer 314. Exemplary core layer materials include TaO or TiO. Core-to-NFT spacer layer 314 can include, for example, $SiO_2$ or $Al_2O_3$. Wafer 301 can be silicon, AlTiC, or other electronic substrate composite materials known in the art that can be used as substrates for electronic devices and other such structures. Peg region 322 of a near-field transducer is pattern-deposited on top of core-to-NFT spacer layer 314 with standard process sequence, such as: a) Au deposition; b) photo lithography; c) Au ion beam etch (IBE); and d) photoresist strip. Near-field transducer materials can include plasmonic metals such as gold, silver, copper, or alloys thereof.

Figure 3B:
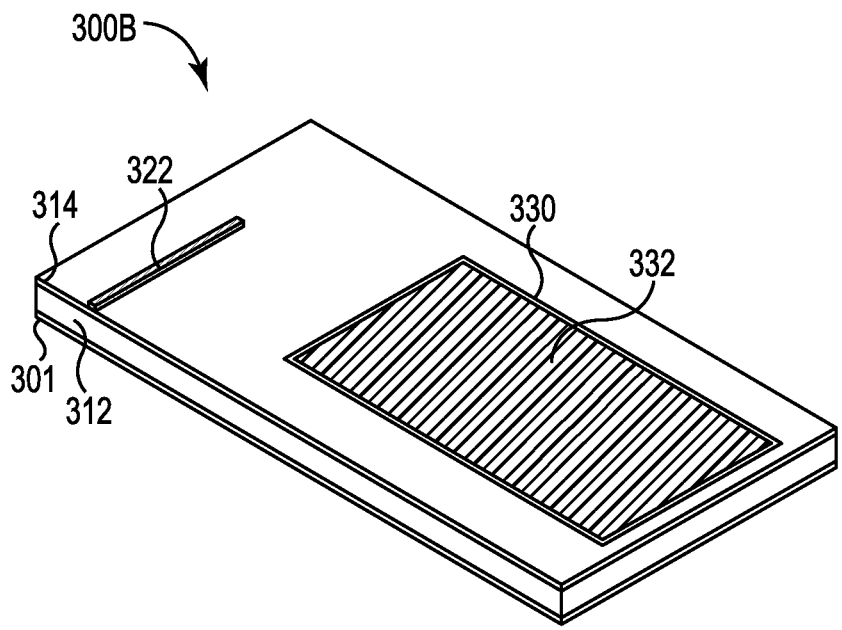

A block of core-to-NFT spacer layer is wet etched away in the ELG area. The wet etch stops on waveguide core layer 312. A 15-25 nm layer of ruthenium metal 332 is deposited in the etched out area using a standard liftoff process. The ruthenium layer 332 will serve as the ELG in the pre-processed wafer. This sequence performed on pre-processed wafer 300B is shown in FIG. 3B.

Figure 3C:
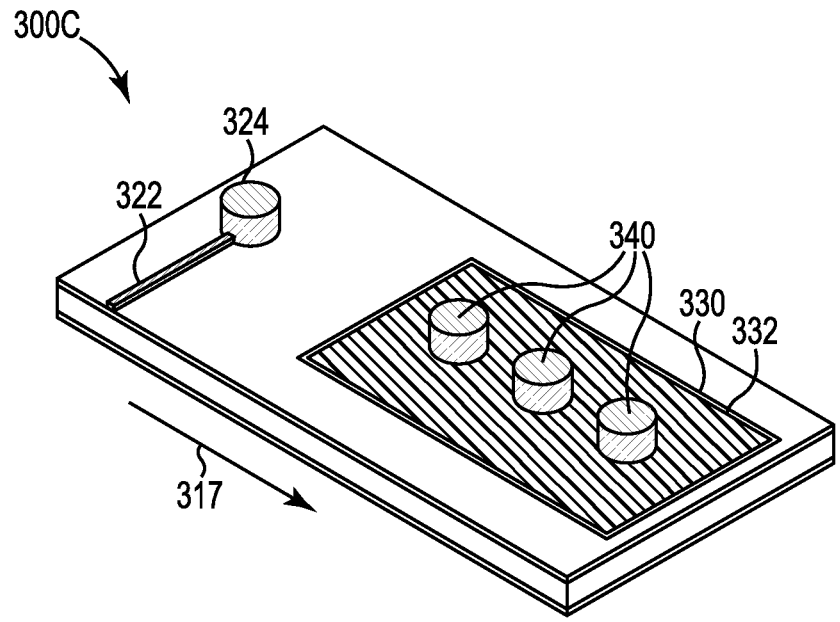

FIG. 3C is an illustration showing the deposition of 100 nm high gold enlarged region 324 on peg region 322 of the NFT (pre-processed feature). At the same time, a plurality of 100 nm high gold enlarged regions 340 are deposited in ELG area 330. As explained earlier, the pre-processed wafer can have a plurality of pre-processed features (NFTs in FIG. 3C) adjacent to electrical lapping guide 330 along wafer axis 317. In some embodiments, the dimensions of the enlarged region 324 of the pre-processed feature (NFT) on the pre-processed wafer 300A are the same as the dimensions of the enlarged regions 340 deposited in the ELG area. The simultaneous deposition of enlarged regions 324 and 340 increase the accuracy of eventual lapping of peg region 322 as will be shown later on.

Figure 3D:
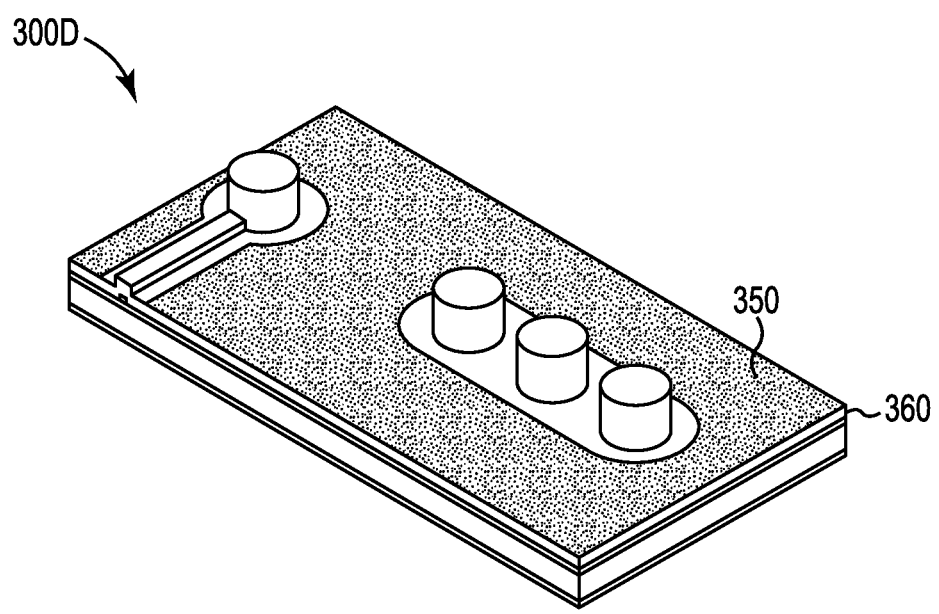

Pre-processed wafer 300C is blanked covered with a 40 nm to 70 nm thick oxide layer 360 (alumina or silica, for example). For example, if the peg region thickness is about 25 nm and the NPS thickness is about 30 nm, the oxide layer is about 55 nm. After chemical mechanical planarization (CMP), the oxide layer over the peg region will be flat with the wafer top surface. FIG. 3D shows pre-processed wafer 300D after 10-20 nm of hard mask 350 (amorphous carbon, for example) has been pattern deposited over the pre-processed wafer.

Figure 3E:
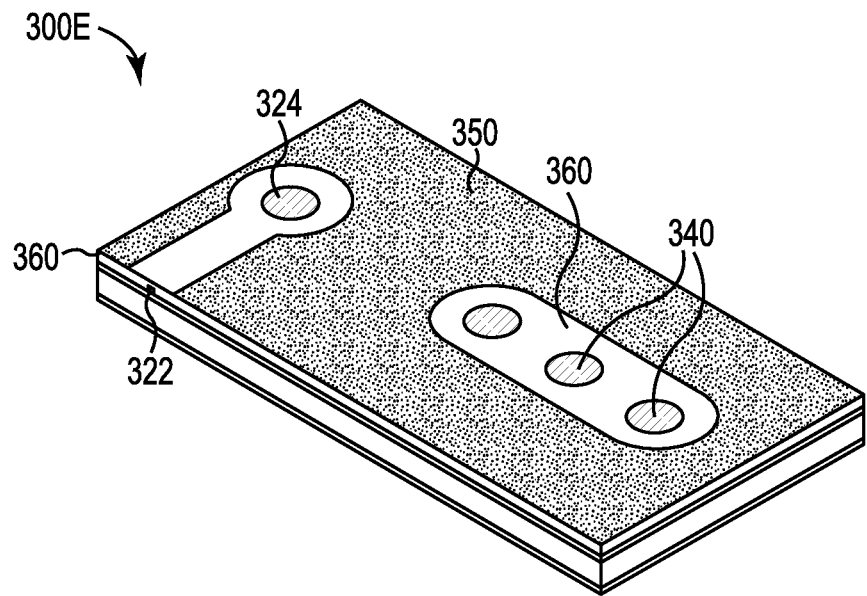
Figure 3F:
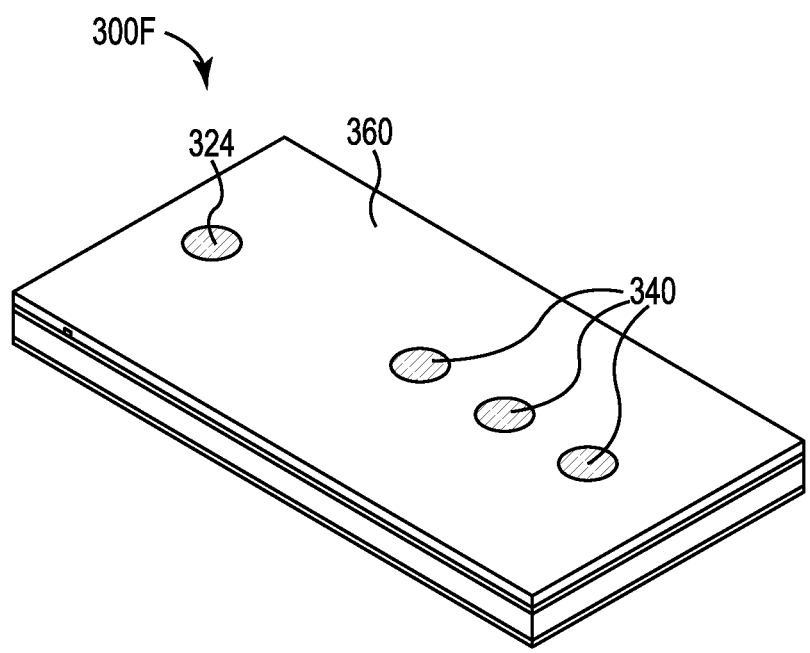

FIG. 3E is an illustration of pre-processed wafer 300E after the top part of enlarged regions 324 and 340 have been polished away with a CMP process. The rest of the pre-processed wafer (with oxide coating) is protected by hard mask layer 350 during the CMP. Hard mask layer 350 is ashed away as shown in FIG. 3F to produce pre-processed wafer 300F that includes polished gold enlarged regions 324 and 340 and oxide layer 360.

Figure 3G:
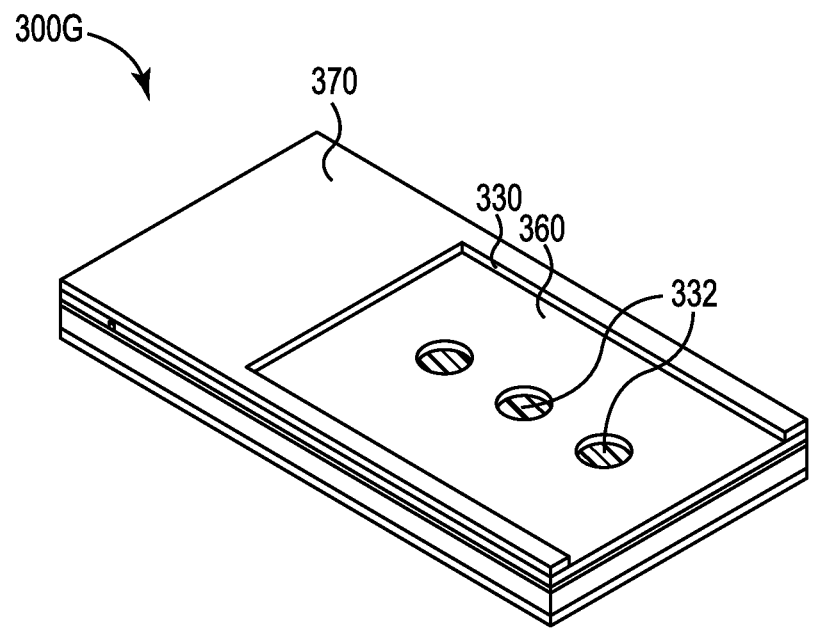

The NFT enlarged regions are protected with patterned photoresist 370 as illustrated in FIG. 3G. Enlarged regions in ELG area 330 are then wet etched away exposing ruthenium layer 332 in areas not protected by oxide layer 360 as shown in FIG. 3G. The wet etch process does not etch oxide layer 360 or ruthenium layer 332.

Figure 3H:
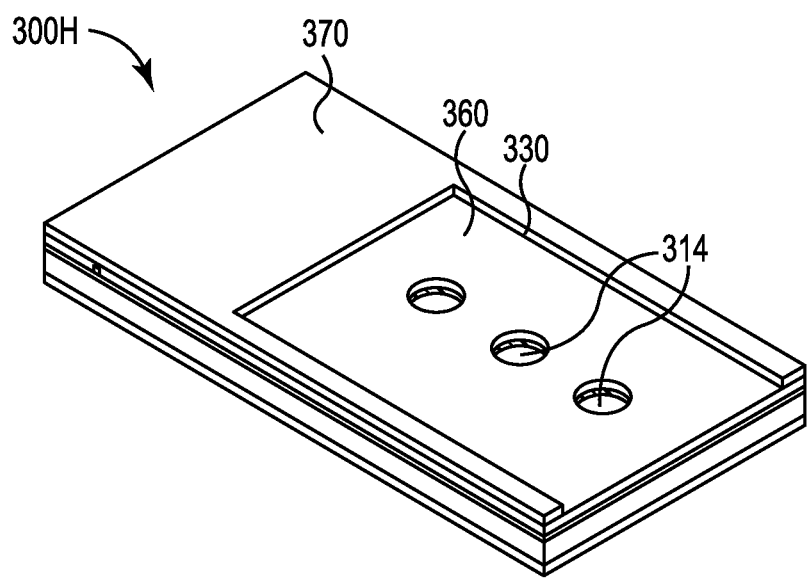
Figure 3I:
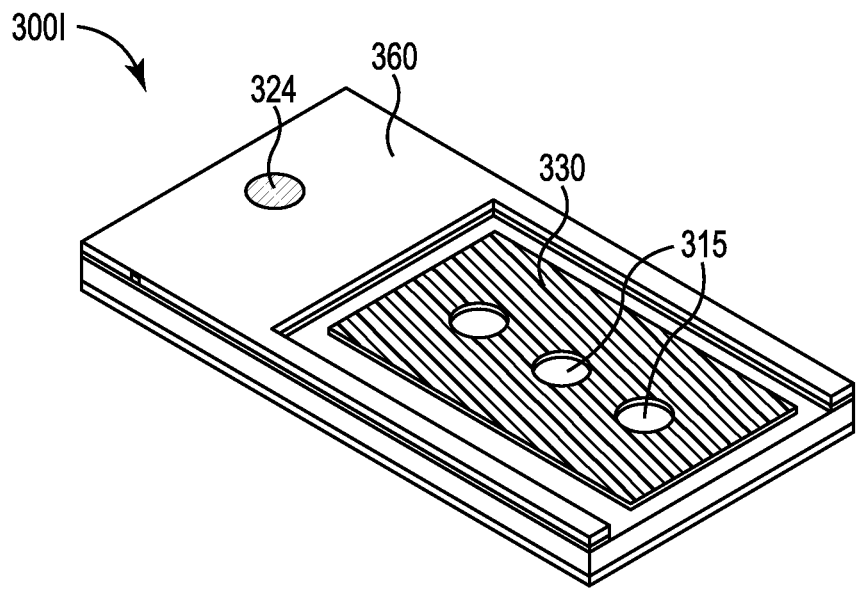

The exposed ruthenium layer is etched (oxygen reactive ion etch (RIE) or oxygen inductively couple plasma (ICP)) using oxide layer 360 as a mask as shown in FIG. 3H. Oxygen RIE or ICP etching has excellent selectivity between oxide layer mask 360 and the ruthenium layer. The etching exposes waveguide core layer 312 in the areas etched away. Further etching of oxide layer 360 and removal of photoresist layer 370 give the structure illustrated in FIG. 3I. The etched out areas (discs) of ruthenium help to define notches in the back edge of the ELG at the end of the process as will be shown further herein. These discs in the ruthenium layer are defined at the same time as the NFT enlarged areas. The back edge of the final ELG will be directly related to the break point of the NFT. They have the same polarity in the process bias. For example, if the dose of radiation is higher during the photoresist defining step used to form the enlarged regions of both the NFTs and the ELGs, both dimensions of the NFT and the ELG will be larger. In this case, the NFT break point will move towards the ABS at the same time the back edge of the NFT will move towards the ABS (front left of figure). This will be shown in more detail in FIG. 4.

Figure 3J:
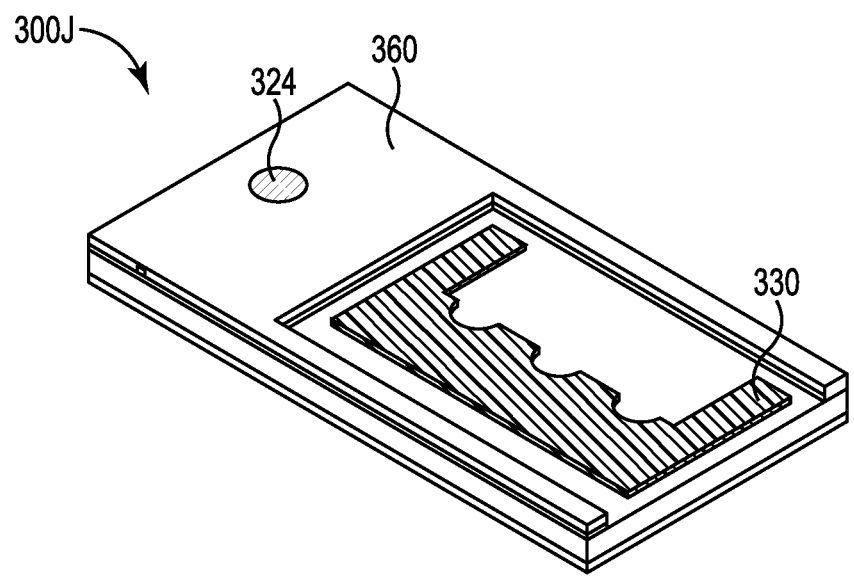

Ruthenium layer 332 is then pattern etched to isolate ELG 330. ELG 330 includes features 315 (in this example, circular holes) that are substantially the same shape and size as enlarged region 324 of the NFT. ELG 330 is then etched to form the final ELG (which is shown in more detail in FIG. 2) as shown in FIG. 3J.

The process illustrated in FIGS. 3A-3J is illustrated for an apparatus for which the pre-processed feature disposed on the wafer is an NFT that includes two parts—an enlarged region disposed adjacent to a peg region as shown in FIG. 1. However, the illustrated process should not be construed to be limited to this type of NFT. This process can be applied to any NFT that has a peg region with a critical length. Additionally, the illustrated process also can be used without the disk CMP step (shown in FIG. 3E). The top part of the enlarged region of the ELG can be etched away using a wet etch leaving holes in the dielectric layer. The resultant dielectric with holes can be used as the pattern mask to transfer the pre-processed feature having a plurality of notches into the ruthenium structure of the electrical lapping guide.

One advantage of the disclosed and illustrated process is that the enlarged region 324 of the pre-processed feature is formed at the same time as the notches in ruthenium layer 332. In the illustrated embodiments, the enlarged region 324 is a circular feature and the notches in ruthenium layer 332 are also circular features with the same circumferences. Thus, when both features (enlarged region of pre-processed feature and notches) are formed by the same process at the same time, they have the same process bias.

Figure 4:
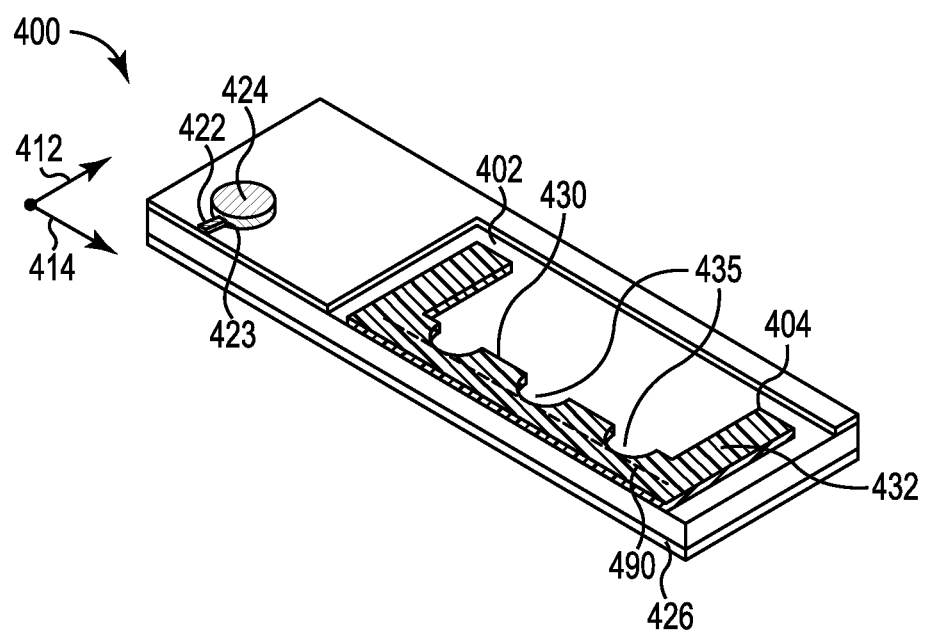
FIG. 4 is a perspective view of an embodiment of a disclosed apparatus.

FIG. 4 is an illustration of a disclosed apparatus that includes pre-processed wafer 400. Pre-processed wafer 400 has at least one pre-processed feature (at least one NFT that comprises enlarged region 424, peg region 422, and break point 423) disposed thereupon. Pre-processed wafer 400 also includes at least one electrical lapping guide 432. As a result of the process described above and illustrated in FIGS. 3A-3J, the electrical lapping guide 432 and at least one pre-processed feature (NFT 422, 424) are positioned on pre-processed wafer 400 such that the final desired length of peg region 422 (from lapping edge to break point 423) of the NFT is defined by the electrical resistance of electrical lapping guide 432 when lapped to about 200 nm to 300 nm before reaching dashed line 490. Dashed line 490 is tangent to the plurality of notches 435 (which, in the illustrated embodiment, are semi-circles). The electrical lapping guide 432 has first contact region 402 and second contact region 404 configured to electrically connect electrical lapping guide 432 to electrical leads. Electrical lapping guide 432 also includes lapping edge 426 that includes an air-bearing plane axis 414, the air-bearing plane axis being parallel to lapping edge 426 and perpendicular to lapping axis 412 as shown in FIG. 4. Electrical lapping guide 432 on pre-processed wafer 400 also includes back edge 430 that includes a plurality of notches 435. The pre-processed feature (NFT 422, 424) is disposed adjacent to the electrical lapping guide 432 along air-bearing plane axis 414.

Figure 5:
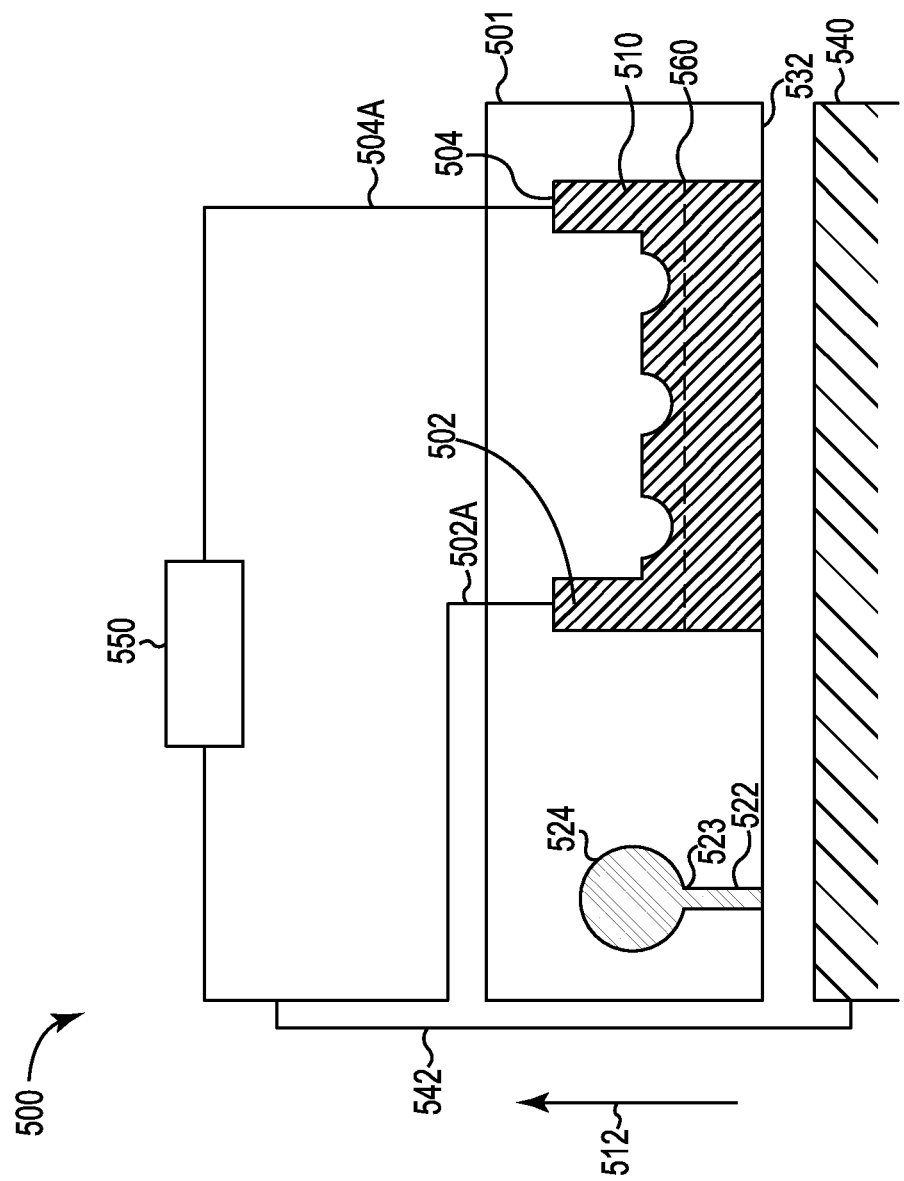
FIG. 5 is a pictorial representation of a representative system that can be used to carry out the methods disclosed herein.

FIG. 5 is a pictorial representation of a representative system that can be used to carry out the methods disclosed herein. System 500 includes pre-processed wafer 501 that includes ELG 510 and pre-processed NFT that includes enlarged region 524, peg region 522, and break point 523. First contact region 502 and second contact region 504 of ELG 510 are connected via electrical leads 502a and 504a respectively to controller 550. Controller 550 is configured to monitor the resistance across ELG 510. Controller 550 is also configured to control lapping tool 540 via lapping tool lead 542. Pressure is applied to lapping tool 540, thereby removing wafer material from wafer 501 and, simultaneously, from NFT peg region 522 and ELG lapping edge 532. During lapping, the resistance of the ELG is monitored by controller 550. Lapping edge 532 is lapped away until it reaches a predetermined value (the resistance of ELG 510 when lapping edge (air-bearing surface after lapping) is at dashed line 560). The predetermined value is such that when the ELG lapping edge is abraded to dashed line 560, the predetermined value of resistance is reached so that the desired or predetermined length of peg 522 from lapping edge 532 to break point 523 is reached. When the predetermined value of resistance is reached, the closest distance from the bottom of the notches to dashed line 560 (air-bearing surface after lapping) is around 200 nm to 300 nm.

Generally, controller 550 can be configured to implement an algorithm defined by programmed instructions executable by controller 550. As lapping tool 540 laps lapping edge 532 of wafer 501, the resistance of ELG 510 changes which is detected by controller 550. In some embodiments, the pre-processed wafer can include two or more ELGs that flank pre-processed features. The ELGs are on both sides of the pre-processed features. In other words, the pre-processed features are located between the ELGs with respect to the air-bearing plane axis. For example, if a first ELG is to the left of a pre-processed feature(s) and a second ELG is to the right of the pre-processed feature(s) then, if controller 550 senses a higher resistance, for example, from the ELG on the left than from the ELG on the right, this can indicate that the left side of wafer 510 is being lapped at a faster rate than the right side of wafer 510. In this situation, controller 550 can be configured to operate one or more pistons on the lapping tool to apply more pressure to the right side of the pre-processed wafer as compared to the left side of the pre-processed wafer until the resistances from the left ELG and the right ELG are equalized. In some embodiments, a first ELG can provide reader dimension control and a second ELG can provide NFT peg break point control.

Figure 6:
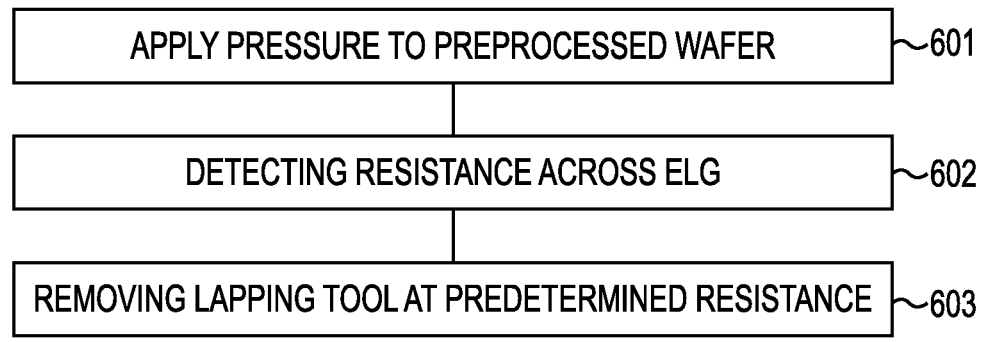
FIG. 6 is a flow diagram demonstrating an embodiment of a disclosed method.

FIG. 6 is a flow diagram demonstrating an embodiment of a disclosed method. Pressure is applied with a lapping tool to a pre-processed wafer as shown in step 601. The pre-processed wafer includes a lapping surface, at least one pre-processed features, and at least one electrical lapping guide. The electrical lapping guide includes first and second contact regions configured to electrically connect the electrical lapping guide to electrical leads, a lapping edge comprising an air-bearing plane axis, the air-bearing plane axis being orthogonal to a lapping axis, and a back edge opposite the lapping edge, the back edge of the electrical lapping guide comprising a plurality of notches. The pre-processed feature is disposed adjacent to the electrical lapping guide along the air-bearing plane axis. The disclosed method also includes detecting a resistance between the first and second contact region of the electrical lapping guide as shown in step 602. The lapping tool is removed when resistance across the electrical lapping guide reaches a predetermined value (step 603).

All references and publications cited herein are expressly incorporated herein by reference in their entirety into this disclosure except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

The invention claimed is:

1. An apparatus comprising:
   an electrical lapping guide comprising:
      a body having a thickness along a wafer axis, the body comprising:
         a first contact region and a second contact region having a minimal distance therebetween, the first and second contact regions configured to electrically connect the electrical lapping guide to electrical leads;
         a lapping edge comprising an air-bearing plane axis, the air-bearing plane axis being perpendicular to a lapping axis; and
         a back edge opposite the lapping edge, the back edge comprising a plurality of notches; and
      a layer of conductive material having a resistivity.

2. An apparatus according to claim 1, wherein the conductive material has a resistivity of greater than about $5 \times 10^{-8}$ ohm-m.

3. An apparatus according to claim 1, wherein the conductive material has a resistivity of greater than about $1 \times 10^{-7}$ ohm-m.

4. An apparatus according to claim 1, wherein the conductive material is selected from the group consisting of chromium, tantalum, tungsten, titanium, vanadium, ruthenium, rhodium, and combinations thereof.

5. An apparatus according to claim 1, wherein the conductive material comprises ruthenium.

6. An apparatus according to claim 1, wherein the first contact region, the second contact region, or both are extensions of the body of the electrical lapping guide.

7. An apparatus according to claim 1, wherein the minimal distance between the first contact region and the second contact region of the electrical lapping guide is from about 5 µm to about 900 µm.

8. An apparatus according to claim 1, wherein the thickness of the electrical lapping guide is from about 5 nm to about 1000 nm.

9. An apparatus, comprising:
   a pre-processed wafer comprising:
      at least one pre-processed feature disposed on the wafer;
      at least one electrical lapping guide comprising:
         first and second contact regions configured to electrically connect the electrical lapping guide to electrical leads;
         a lapping edge comprising an air-bearing plane axis, the air-bearing plane axis being perpendicular to a lapping axis; and
         a back edge opposite the lapping edge, the back edge comprising a plurality of notches,
   the at least one pre-processed feature disposed adjacent to the at least one electrical lapping guide along the air-bearing plane axis.

10. An apparatus according to claim 9, wherein the at least one pre-processed feature comprises a near-field transducer.

11. An apparatus according to claim 10, wherein the at least one pre-processed feature comprises a plasmonic metal selected from copper, silver, gold, or a combination thereof.

12. An apparatus according to claim 10, wherein the near-field transducer comprises an enlarged region and a peg region.

13. An apparatus according to claim 9, comprising two electrical lapping guides configured so that the at least one pre-processed feature is located between the two electrical lapping guides with respect to the air-bearing plane axis.

14. An apparatus according to claim 9, wherein the at least one pre-processed feature and the at least one electrical lapping guide have the same process bias.

15. A system that comprises an apparatus according to claim 9 and a controller configured to monitor resistance across the electrical lapping guide.

16. A system according to claim 9, further comprising a controller, wherein the electrical leads attach the controller to the first contact region and the second contact region of the electrical lapping guide.

17. A system according to claim 9, further comprising a controller and a lapping tool, wherein the controller is configured to control the lapping tool.

18. A method comprising:
   applying pressure with a lapping tool to a pre-processed wafer comprising a lapping surface, at least one preprocessed feature, and at least one electrical lapping guide, the electrical lapping guide comprising:
      first and second contact regions configured to electrically connect the electrical lapping guide to electrical leads;
      a lapping edge comprising an air-bearing plane axis, the air-bearing plane axis being perpendicular to a lapping axis; and
      a back edge opposite the lapping edge, the back edge of the electrical lapping guide comprising a plurality of notches,
   the at least one pre-processed feature disposed adjacent to the at least one electrical lapping guide along the air-bearing plane axis;
   detecting a resistance between the first and second contact region of the electrical lapping guide; and
   removing the lapping tool when the resistance across the electrical lapping guide reaches a predetermined value.

19. A method according to claim 18, wherein the pre-processed feature comprises a near-field transducer.

20. A method according to claim 19, wherein the near-field transducer comprises an enlarged region, a peg region, and a break point where the enlarged region intersects the peg region.

21. A method according to claim 20, wherein the predetermined value of the resistance removes the lapping tool when a predetermined length of the peg region from the lapping edge to the break point is reached.

22. The apparatus according to claim 1, wherein a shape of the notches corresponds to a shape of at least a portion of a feature to be lapped using the electrical lapping guide.

23. The apparatus according to claim 9, wherein a shape of the notches corresponds to a shape of at least a portion of the at least one pre-processed feature.

24. The apparatus according to claim 23, wherein the back edge is in alignment with a break point of the at least one pre-processed feature.

25. The method according to claim 18, wherein a shape of the notches corresponds to a shape of at least a portion of the at least one pre-processed feature.

* * * * *